United States Patent
Hunter et al.

(10) Patent No.: US 8,220,200 B2
(45) Date of Patent: Jul. 17, 2012

(54) METHOD OF EXTENDING THE DURATION OF POLLEN AVAILABILITY DURING SEED PRODUCTION

(75) Inventors: James L. Hunter, Centenial, CO (US); Scott M. Nelson, Urbandale, IA (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 210 days.

(21) Appl. No.: 12/726,082

(22) Filed: Mar. 17, 2010

(65) Prior Publication Data
US 2010/0236146 A1  Sep. 23, 2010

Related U.S. Application Data

(60) Provisional application No. 61/160,790, filed on Mar. 17, 2009.

(51) Int. Cl.
*A01C 1/00* (2006.01)
*A01G 7/00* (2006.01)
*A01H 4/00* (2006.01)

(52) U.S. Cl. .................................. 47/58.1 SE
(58) Field of Classification Search .............. 47/58.1 SE, 47/58.1 R
See application file for complete search history.

(56) References Cited

U.S. PATENT DOCUMENTS

| | | | |
|---|---|---|---|
| 5,646,846 A | 7/1997 | Bruce et al. | |
| 5,913,915 A | 6/1999 | McQuinn | |
| 5,955,973 A | 9/1999 | Anderson | |
| 6,089,743 A | 7/2000 | McQuinn | |
| 6,122,581 A | 9/2000 | McQuinn | |
| 6,199,000 B1 | 3/2001 | Keller et al. | |
| 6,386,128 B1 | 5/2002 | Svoboda et al. | |
| 6,505,124 B2 | 1/2003 | Carr et al. | |
| 6,505,146 B1 | 1/2003 | Blackmer | |
| 6,510,367 B1 | 1/2003 | McQuinn | |
| 6,516,271 B2 | 2/2003 | Upadhyaya et al. | |
| 6,516,733 B1 | 2/2003 | Sauder et al. | |
| 6,553,299 B1 | 4/2003 | Keller et al. | |
| 6,553,312 B2 | 4/2003 | Upadhyaya et al. | |
| 6,671,698 B2 | 12/2003 | Pickett et al. | |
| 6,672,228 B1 | 1/2004 | Groelz et al. | |
| 6,760,654 B2 | 7/2004 | Beck | |
| 6,810,315 B2 | 10/2004 | Cessac | |
| 6,941,225 B2 | 9/2005 | Upadhyaya et al. | |
| 6,997,120 B2 | 2/2006 | Gabriel | |

(Continued)

OTHER PUBLICATIONS

David Beck; *Planting Hybrid Maize*; Seed Course—Chapter 7; Jul. 23, 2002; CIMMYT, Int. http://www.cimmyt.org/Research/Maize/qpm2002/Seed/Seed7.htm Site visited Mar. 17, 2010.

(Continued)

*Primary Examiner* — Monica Williams
(74) *Attorney, Agent, or Firm* — Alston & Bird LLP

(57) ABSTRACT

In various embodiments, the present invention provides a method of extending the duration of pollen availability by planting a section of male parent seeds that includes alternating groups of male seeds adjacent to a section of female parent seeds in a field. The male seeds are planted and/or conditioned so that one group of male seeds produces plants that generally shed pollen at a different time than plants produced by the one or more other groups of male seeds. In some embodiments, the field may include multiple male and female sections and the male seed groups may alternate between sections so as to create a checkerboard pattern of male seed groups within the field. In some embodiments, the field may be planted with the aid of a positional data system.

20 Claims, 4 Drawing Sheets

U.S. PATENT DOCUMENTS

| | | |
|---|---|---|
| 7,197,992 B2 | 4/2007 | Gabriel |
| 2003/0187560 A1 | 10/2003 | Keller et al. |
| 2006/0278143 A1 | 12/2006 | Deppermann et al. |
| 2007/0131152 A1 | 6/2007 | Gabriel |
| 2008/0004778 A1 | 1/2008 | Rekow |

OTHER PUBLICATIONS

Ken Russell and Leah Sandall; *Corn Breeding: Lessons from the Past*; Journal of Natural Resources and Life Sciences Education; 2005; vol. 34 http://croptechnology.unl.edu/printLesson.cgi?lessonID-1075412493 Site visited Mar. 17, 2010.

METHOD OF EXTENDING THE DURATION OF POLLEN AVAILABILITY DURING SEED PRODUCTION

CROSS REFERENCE TO RELATED APPLICATIONS

The present application claims priority from U.S. Provisional Application No. 61/160,790, filed Mar. 17, 2009, which is hereby incorporated herein in its entirety by reference.

FIELD OF THE INVENTION

The present invention relates generally to seed production. More specifically, the present invention provides a method for extending the duration of pollen availability during seed production.

BACKGROUND OF THE INVENTION

For a variety of reasons, plant species may be intentionally bred. For example, in some applications plant species are intentionally bred to form hybrid plant species. In some applications, hybrid plants are bred to exhibit various desirable traits. Such traits may include, for example, resistance to heat and drought, resistance to disease and insect damage, improved yield characteristics, and improved agronomic quality. In general, plants may be capable of self-pollination, cross-pollination, or both. Self-pollination describes pollination using pollen from one flower that is transferred to the same or another flower of the same plant. Cross-pollination describes pollination using pollen delivered from a flower of a different plant from a different family or line.

Plants that have been self-pollinated and selected for many generations become homozygous at almost all gene loci and produce a uniform population of true breeding progeny. A cross between two different homozygous lines produces a uniform population of hybrid plants that may be heterozygous for many gene loci. A cross of two plants each heterozygous at a number of gene loci will produce a population of heterogeneous plants that differ genetically and will not be uniform.

Maize (*Zea mays* L.), often referred to as corn in the United States, can be bred by both self-pollination and cross-pollination techniques. Maize has separate male and female flowers on the same plant. The male flowers are located on the tassel and the female flowers are located on the ear. Natural pollination occurs in maize when wind blows pollen from the tassels to the silks that protrude from the tops of the ears.

The development of a hybrid maize variety in a maize seed production program involves three steps: (1) the selection of plants from various germplasm pools for initial breeding crosses; (2) self-pollination of the selected plants from the breeding crosses for several generations to produce a series of inbred lines, which, individually breed true and are highly uniform; and (3) crossing a selected inbred line with an unrelated inbred line to produce the hybrid progeny. After a sufficient amount of inbreeding successive filial generations will merely serve to increase seed of the developed inbred. Preferably, an inbred line should comprise homozygous alleles at about 95% or more of its loci.

During the maize inbreeding process, vigor of the lines decreases. Vigor is restored when two different inbred lines are crossed to produce the hybrid progeny. An important consequence of the homozygosity and homogeneity of the inbred lines is that the hybrid between a defined pair of inbreds may be reproduced indefinitely as long as the homogeneity of the inbred parents is maintained. Once the inbreds that create a superior hybrid have been identified, a continual supply of the hybrid seed can be produced using these inbred parents and the hybrid corn plants can then be generated from this hybrid seed supply.

Achieving synchronization between male parent flowering and female parent flowering (sometimes called "niche") is often a desirable step in maximizing successful cross-pollination of plants that are planted in the same or neighboring fields. Several techniques are known in the art to improve this synchronization. For example, one technique involves planting several rows of female parent plants and one row of a male parent plant adjacent the several rows of female parent plants. At some later time, another row of male parent plants is planted adjacent the first row of male parent plants. This is sometimes referred to as "split male delay planting" and results in an extended pollination period due to the delayed pollination production from the second row of male plants. Another technique involves planting male and female parent plants and then cutting a portion of the leaf tissue of a row of emerging male parent plants in order to shock the plants and delay their development and production of pollen. This technique also results in an extended pollination period due to the delayed pollination production from the male plants that were cut.

The above techniques, however, have certain disadvantages. For example, prior art delay planting often produces excess competition between the first and second rows of flowering male plants, resulting in less than ideal pollination of the female plants. Additionally, depending on the orientation of the plants in a particular field, the first row of male plants planted using prior art delay planting may shade the second row of male plants, which can suppress or impede proper development of the second row of male plants and thus affect the level and timing of pollination from the male plants. If cutting is used, the cut plants may have reduced stature and pollen yield, and may also be more susceptible to some diseases. In addition, pathogens causing viral or bacterial infections may be transmitted from a diseased plant to a healthy plant via the cutting mechanism or device.

As a result of the above, there is a need in the art for an improved method for planting seeds to extend the duration of pollen availability. In various embodiments, the method should provide an efficient solution for facilitating cross-pollination of female plants. For example, the method should provide efficient use of male plants so as to maximize planting space and should also provide accurate placement of male plants with respect to the female plants.

SUMMARY OF VARIOUS EMBODIMENTS

The present invention addresses the above needs and achieves other advantages by providing a method of extending the pollen availability during seed production. In general, the method includes planting a section of male seeds in a field, and planting a section of female seeds in the field, the section of female seeds comprising at least one row of female seeds adjacent and substantially parallel to the section of male seeds, wherein planting the section of male seeds comprises planting a row of male seeds that includes at least two alternating groups of male seeds, and wherein one group of male seeds is planted or conditioned so as to produce plants that generally shed pollen at a different time than plants produced by one or more other groups of male seeds. Some embodiments further comprise capturing the locations of at least one of the groups of male seeds using a positional data system.

Some embodiments may further comprise capturing the locations of the planted seeds within at least one of the groups of male seeds using a positional data system. Some embodiments may further comprise activating a seed planter using a positional data system to plant the section of male seeds and the section of female seeds. In some embodiments, the seed planter is activated using at least one of a timer and a satellite navigation system.

In some embodiments, planting the section of male seeds may comprise planting the one group of male seeds at a different time than planting the one or more other groups of male seeds. Some embodiments may further comprise capturing the location using a positional data system where at least one of the groups of male seeds is to be planted. Some embodiments may further comprise capturing the location using a positional data system where individual seeds within at least one of the groups of male seeds are to be planted. In some embodiments, planting the section of male seeds comprises planting the one group of male seeds in a position that is slightly offset from the one or more other groups of male seeds such that the row of male seeds is a slightly staggered row of male seeds.

In some embodiments, planting the section of male seeds further comprises applying an additive to the field in areas of the field proximate the one group of male seeds, and wherein the additive is configured so that plants produced by the one group of male seeds generally shed pollen at a different time than plants produced by the one or more other groups of male seeds. In some embodiments, the additive is applied to the field substantially concurrently with planting the one group of male seeds. In some embodiments, the additive comprises at least one of a hormone additive or a chemical additive. Some embodiments further comprise coating the one group of male seeds with a coating that is configured so that plants produced by the one group of male seeds generally shed pollen at a different time than plants produced by the one or more other groups of male seeds.

In some embodiments, planting the section of male seeds comprises planting the one group of male seeds at a later time than planting the one or more other groups of male seeds such that plants produced by the one group of male seeds generally shed pollen at a later time than plants produced by the one or more other groups of male seeds. In some embodiments, planting the section of male seeds further comprises applying an additive to the field in areas of the field proximate the one group of male seeds, and wherein the additive is configured so that plants produced by the one group of male seeds generally shed pollen at a later time than plants produced by the one or more other groups of male seeds. Some embodiments further comprise coating the one group of male seeds with a coating that is configured so that plants produced by the one group of male seeds generally shed pollen at a later time than plants produced by the one or more other groups of male seeds.

In some embodiments, planting the section of male seeds further comprises applying an additive to the field in areas of the field proximate the one group of male seeds, and wherein the additive is configured so that plants produced by the one group of male seeds generally shed pollen at an earlier time than plants produced by the one or more other groups of male seeds. Some embodiments further comprise coating the one group of male seeds with a coating that is configured so that plants produced by the one group of male seeds generally shed pollen at an earlier time than plants produced by the one or more other groups of male seeds.

Some embodiments further comprise planting a second section of male seeds, wherein planting the second section of male seeds comprises planting a row of male seeds adjacent to and on an opposite side of the first section of female seeds, wherein the row of male seeds of the second section of male seeds includes at least two alternating groups of male seeds, and wherein one group of male seeds is planted or conditioned so as to produce plants that generally shed pollen at a different time than plants produced by the one or more other groups of male seeds. In some embodiments, each of the groups of male seeds of the first and second sections of male seeds extends a substantially similar seed planting length, and wherein the first section of male seeds begins with a group of first male seeds and alternates to a group of second male seeds, and the second section of male seeds begins a group of second male seeds and alternates to a group of first male seeds, and wherein one of the group of first male seeds or the group of second male seeds is planted or conditioned to produce plants that generally shed pollen at a different time than the other of the group of first male seeds or the group of second male seeds.

BRIEF DESCRIPTION OF THE DRAWINGS

Figure 1:
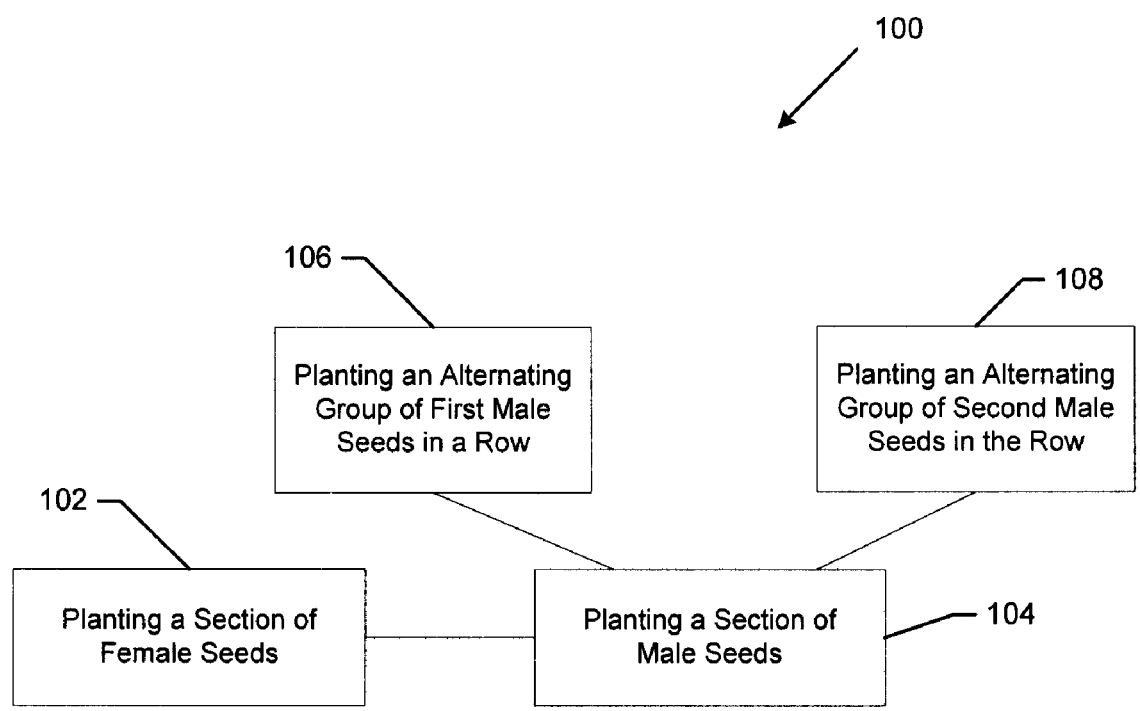
Figure 2:
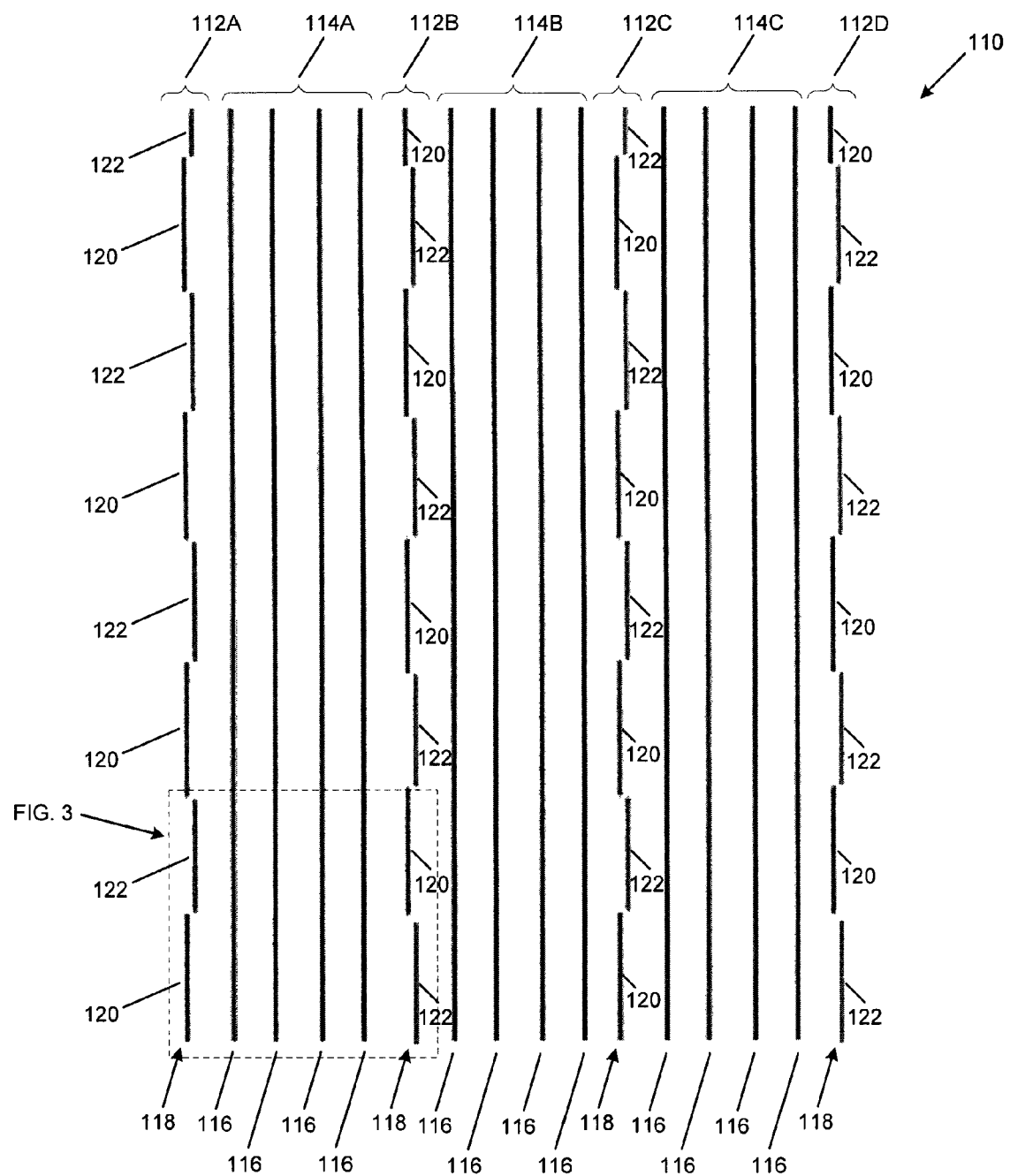
Figure 3:
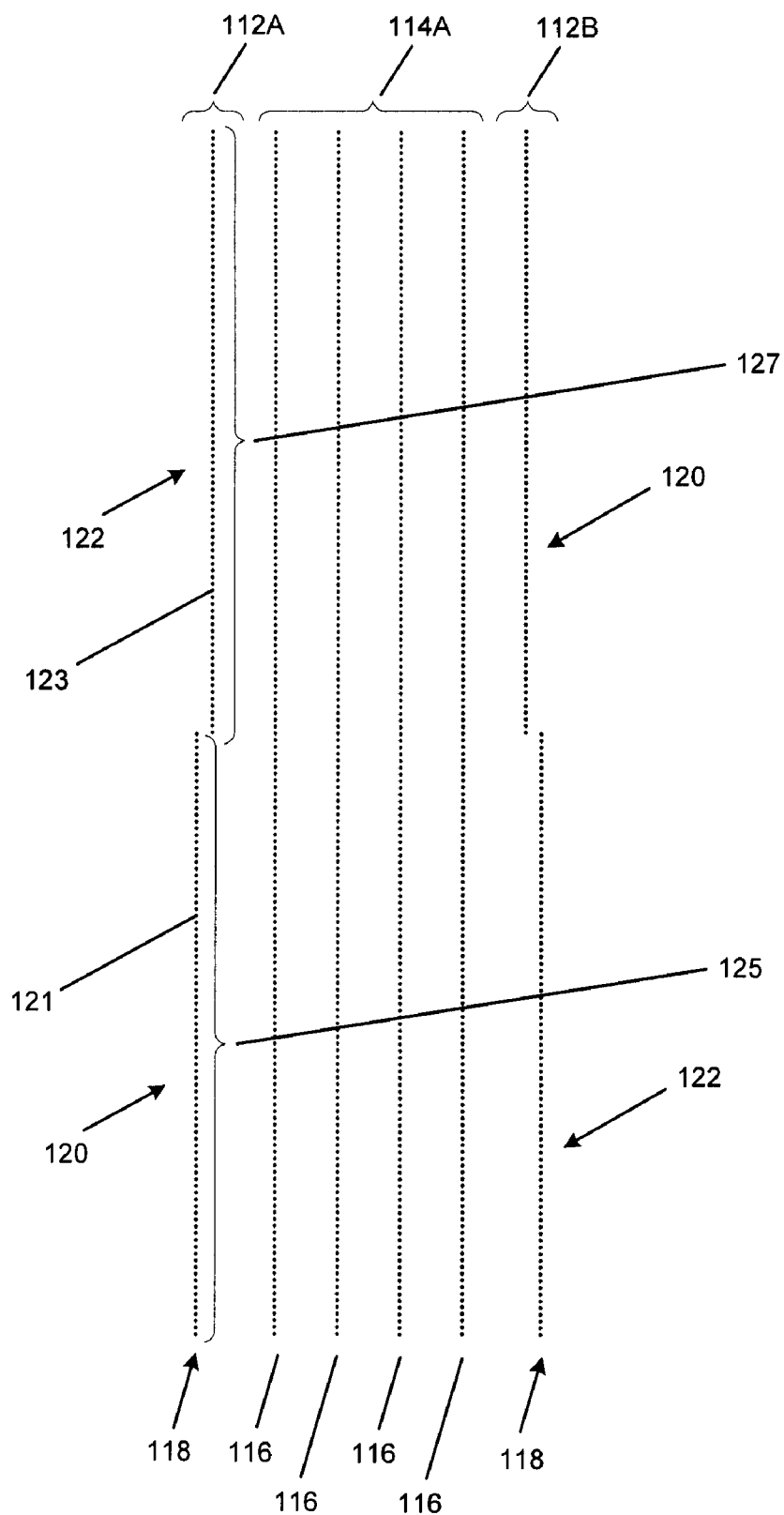
Figure 4:
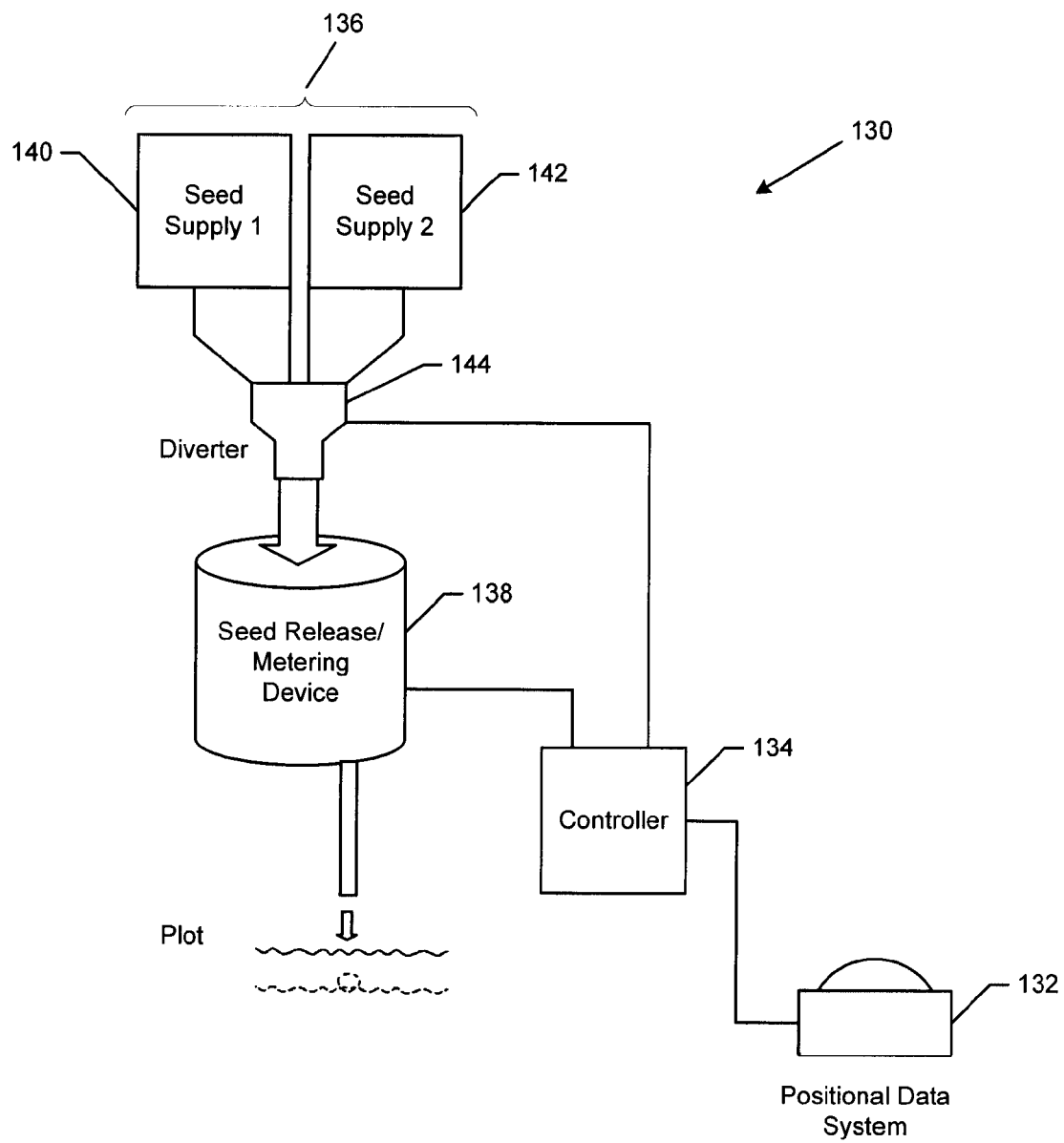

Having thus described the invention in general terms, reference will now be made to the accompanying drawings, which are not necessarily drawn to scale, and wherein:

FIG. 1 shows a flowchart representing a method of extending the duration of pollen availability in accordance with one exemplary embodiment of the present invention;

FIG. 2 shows a schematic drawing representing a portion of a field of seeds planted in accordance with one exemplary embodiment of the present invention;

FIG. 3 shows a schematic drawing representing a portion of the field of seeds planted in accordance with the exemplary embodiment shown in FIG. 2; and FIG. 4 shows a partial schematic of a seed planter that includes a positional data system in accordance with one exemplary embodiment of the present invention.

DETAILED DESCRIPTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

In various embodiments, the present invention describes planting two sets of parent seeds in a manner designed to extend the duration of pollen availability. In various embodiments, pollen availability may refer to the presence of mature pollen grains released by one or more male reproductive plant structures and available for reception by one or more female reproductive plant structures. It should be noted that although the embodiments described herein generally include planting two sets of parent seeds to produce plants that include hybrid seeds, in various other embodiments, the present invention may include planting two sets of parent seeds to produce various other types of seeds. Thus, the present invention should not be limited to the production of plants that include hybrid seeds.

The embodiments of the present invention describe one set of parent seeds that produces female parent plants (i.e., the pollen receiving or receptor plant), and another set of parent seeds that produces male parent plants (i.e., the pollinating or pollen generator plant). For the purpose of the current specification and appended drawings and claims, seeds that produce the female parent plants will be referred to as "female seeds" and seeds that produce the male parent plants will be referred to as "male seeds." Additionally, it should be noted that although the current specification and appended drawings may describe exemplary embodiments wherein the seeds produce maize plants, it is understood that the teachings of the present invention are equally applicable to seeds that produce any plants capable of cross-pollination. Such other plants may include, but need not be limited to, other vegetables, flowers, and agronomic plants including rapeseed, rice, wheat, canola, sunflower, and sorghum.

FIG. 1 depicts a general flowchart representing a method 100 of extending the duration of pollen availability in accordance with an exemplary embodiment of the present invention. As shown in the figure, in block 102 a section of female seeds is planted. In block 104, a section of male seeds is planted. As shown in the figure, planting the section of male seeds comprises planting an alternating group of first male seeds in a row (block 106) and planting an alternating group of second male seeds in the row (block 108). It should be noted that FIG. 1 should not be interpreted as indicating a particular order of planting because various embodiments of the present invention may involve planting the female seed section and the groups of male seeds of the male seed section at approximately the same time, or at various different times, or combinations thereof.

A schematic drawing representing a portion of a field 110 of seeds planted in accordance with one exemplary embodiment of the present invention is depicted in FIG. 2. In the depicted embodiment, the field 110 comprises a field of maize seeds that produce maize plants, however as noted above in various other embodiments fields may comprise any seeds that produce plants capable of cross-pollination. In various embodiments, a field of seeds planted in accordance with the present invention includes one or more sections of male seeds and one or more sections of female seeds. In the depicted embodiment of FIG. 2, the field 110 comprises four male seed sections 112A, 112B, 112C, 112D and three female seed sections 114A, 114B, 114C. As shown in the figure, field 110 is specifically configured with a first male section 112A bounding the field 110 on the left side; a first female section 114A substantially adjacent and to the right of the first male section 112A; a second male section 112B substantially adjacent and to the right of the first female section 114A; a second female section 114B substantially adjacent and to the right of the second male section 112B; a third male section 112C substantially adjacent and to the right of the second female section 114B; a third female section 114C substantially adjacent and to the right of the third male section 112C; and a fourth male section 112D substantially adjacent and to the right of the third female section 114C. The fourth male section 112D bounds the field 110 on the right side. In the depicted embodiment the male and female sections are configured together to create a field 110 having a generally rectangular shape, with each section including seeds planted in a substantially straight rows. Although in other embodiments there may be various other configurations of male and female sections, by interlacing male sections between female sections, the depicted embodiment is configured to allow shedding pollen from the male parent plants in the male sections to be in relatively close proximity to the female parent plants in the female sections. Additionally, by bounding the field with male sections on both sides, pollen from the male parent plants has an increased chance of reaching the female parent plants irrespective of wind direction.

In various embodiments of the present invention, each female seed section may include at least one row of female seeds, and each male seed section may include at least one row of male seeds. In the depicted embodiment, each female seed section 114 comprises four female seed rows 116, and each male seed section 112 comprises one male seed row 118. Although other embodiments of the present invention may include different ratios of female seed rows to male seeds rows in a field, in the depicted embodiment this ratio is 4:1, as is common in the planting of maize seed. In addition, it should be noted that in other embodiments the ratio of female seed rows to male seed rows need not be consistent and thus there may be varying ratios of female seed rows to male seed rows throughout the field.

In various embodiments of the present invention, the rows of male seeds in a field comprise alternating groups of first male seeds and second male seeds, where one group of male seeds is planted and/or conditioned so as to produce male parent plants that generally shed pollen at a different time than male parent plants produced by the one or more other groups of male seeds. It should be noted that in other embodiments, the rows of male seeds may include three or more groups of male seeds that alternate through the row, where the groups of male seeds are planted or conditioned to produce plants that generally shed pollen at different times. These groups of male seeds may be planted or conditioned using any one or any combination of methods described herein, including, but not limited to, planting the groups of male seeds at different times and/or conditioning the seeds and/or areas of the fields proximate the seeds.

In the depicted embodiment of FIG. 2, each male seed row 118 includes a plurality of first male seed groups 120 and a plurality of second male seed groups 122. Detail section 3 of the field 110 is shown in FIG. 3. Although other configurations in other embodiments of the present invention may vary, in the depicted embodiment, each first male seed group 120 comprises approximately ninety individual seeds 121 planted approximately evenly spaced along a seed planting length 125 of approximately thirty-five feet. Likewise, each second male seed group 122 comprises approximately ninety seeds 123 planted approximately evenly spaced along a seed planting length 127 of approximately thirty-five feet. It should be noted, however, that in other embodiments the seed planting length may vary, even varying within each row or throughout the field 110.

Referring back to FIG. 2, in the depicted embodiment the second male seed groups 122 are planted so that the male parent plants produced from the second male seed groups 122 shed pollen at a later time than the male parent plants produced from the first male seed groups 120. In the depicted embodiment, this is accomplished by planting the second male seed groups 122 at a later time than planting of the first male seed groups 120. Although the amount of time delay may vary depending on the nature of the plants, in the depicted embodiment, the first male seed groups 120 and the female seed rows 116 are planted on a first date, and then two to three days later, the second male seed groups 122 are planted. As shown in the figure, in such embodiments the second male seed groups 122 are planted in position that is slightly offset from the first male seed groups 120 such that the row of male seeds 118 creates a slightly staggered row. Although a row of male seeds in various other embodiments need not create a staggered row of male seeds, in the depicted embodiment the second male seed groups 122 are offset from the first male seed groups 120 so that the first male seed groups 120 are not disturbed by any furrow opening and/or closing devices (as may be commonly found on standard seed planters) during planting of the second male seed groups 122. It should be noted that although the rows of male seeds in the depicted embodiment are shown offset in the same direction, in other similar embodiments any portion or portions of a staggered male row may be offset in an opposite direction.

By alternating each row of male seeds 118 between first male seed groups 120 and second male seed groups 122, the depicted embodiment of the present invention makes efficient use of male seeds in the field 110. The embodiment of the present invention depicted in FIG. 2 makes further efficient use of male seeds in the field 110 by alternating the placement of the first and second male seed groups 120, 122 in one row of male seeds 118 with respect to another. Specifically, although in other embodiments the alternating pattern may be reversed, in the depicted embodiment the first section of male seeds 112A includes a row of male seeds 118 that begins with a first male seed group 120 and alternates to a second male seed group 122. This pattern is repeated for the extent of the first section 112A. The next section of male seeds 112B includes a row of male seeds 118 that begins with a second male seed group 122 and alternates to a first male seed group 120. This pattern is repeated for the extent of the second section 112B. The third section of male seeds 112C includes a row of male 118 seeds that begins with a first male seed group 120 and alternates to a second male seed group 122. This pattern is also repeated. The alternating of groups of first and second male seeds is repeated throughout the field so that a "checkerboard" pattern of first male seed groups 120 and second male seed groups 122 is created in the field 110. By creating this checkerboard pattern of male seeds, the pollination period is effectively extended, the probability that sufficient pollen grains will land on each receptive silk is increased thus increasing the chances of successfully pollinating the female plants, the pollen generated by the male parent plants from the second seed groups is evenly distributed, and there is an improved efficient use of the male seeds throughout the field 110.

In order to accurately plant the male and female seed sections within a field, some embodiments of the present invention may employ precision agricultural equipment. In particular, the depicted embodiment of the present invention employs a seed planter equipped with a positional data system that may be used to guide and/or control the seed planter to release seeds at certain locations within the field. In various other embodiments, a positional data system may be used to capture seed group locations, individual seed locations, and/or locations where seed groups or individual seeds are to be planted. FIG. 4 shows a partial schematic of a seed planter 130 that includes a positional data system 132, a controller 134, a seed supply 136, and a seed release/metering device 138. In the depicted embodiment, the controller 134 controls the seed release/metering device 138 to release seeds at certain locations within the field based on the position of the seed planter 130 within the field as determined by the positional data system 132. In other embodiments, rather than triggering the seed release/metering device 138, the positional data system 132 may be used to record the locations of the dispensed seeds.

In various embodiments, the positional data system 132 may include, but need not be limited to, one or a combination of the following: a timer system, a timer and encoder system, a timer and ground speed system, a cable system, a dead reckoning system, or a satellite navigation system. An example of a cable system may include a cable that is wound about a spool and that includes position indicator buttons placed periodically along the length thereof such that as the seed planter is moved through the research field the cable is unwound and the position indicator buttons are sensed by a check-head or other sensing device. An example of a satellite navigation system may include, but need not be limited to, the global positioning system (GPS) or the International Global Navigation Satellite System (GNSS) Service (IGS). GPS systems enable very accurate location determination or position fixing by utilizing measurements of precise timing signals broadcast from a constellation of more than two dozen GPS satellites in orbit around the earth. Locations can be determined, for example, in terms of longitude, latitude, and altitude regardless of time, weather and location. Other satellite navigation systems include, but need not be limited to, International Global Navigation Satellite Systems (GNSS) Service (IGS), which have incorporated NAVSTAR satellites of the United States and GLONASS satellites from Russia along with additional satellite constellations to provide robust navigation capability. In general, IGS provides increased precision in location determination and enables the utilization of enhancements in the capabilities of satellite navigation system devices. Another satellite navigation system includes, but need not be limited to, Galileo, which is being built by the European Union as an alternative to GPS and GLONASS. A Differential Global Positioning System (DGPS) is an enhancement of GPS that incorporates additional ground-based reference stations that allow the calculation of differences between the measured GPS positions and the ground-based fixed locations so that corrections can be made for improved accuracy. Differential corrections can be applied either after the raw GPS data is collected (i.e. post-processed), or during data collection (i.e., real-time). Accordingly, it should be understood that, as used herein, the term satellite navigation system is meant to encompass any of a number of different systems including, for example, GPS, IGS, GNSS, NAVSTAR, GLONASS, Galileo, DGPS, etc. By utilizing a positional data system 132 in the depicted embodiment, the second male seed groups may be accurately placed in between the previously planted first male seed groups and the spacing between the seeds as well as the spacing between the male seed sections and the female seed sections may be accurately maintained.

In the embodiment depicted in FIG. 2, the second male seed groups 122 are planted at a later time than the first male seed groups 120 so that the plants produced by the second male seed groups 122 generally shed pollen at a later time than the plants produced by the first male seed groups 120, however in various other embodiments one or more male seed groups may be planted and/or conditioned in other ways so as to produce male parent plants that generally shed pollen at a different time than the male parent plants produced by the one or more other male seed groups. For example, in one embodiment, at least one additive may be applied to or inserted into the field 110 in the areas of the field 110 proximate to where the second male seeds are planted. In various embodiments, the additive may be any additive that is configured to interact with the second male seeds so that the second male seeds produce male parent plants that generally shed pollen at a later time than the male parent plants produced by the first male seeds. Such additives may include, but need not be limited to, materials that inhibit germination such as abscisic acid (ABA) or chemical analogues, materials that increase the osmotic potential in the region around the seed, materials that produce a transient increase in pH that reduces the rate of cell wall loosening, and materials that inhibit water uptake by the seeds. In some embodiments, this additive may be applied by the seed planter concurrent with the planting of the second male seed groups 122. In other embodiments, the additive may be applied before or after the second male seed groups 122 are planted. In various other embodiments, the additive may be applied using a different device or it may be applied by hand.

In some embodiments, the second male seeds may be produced with an additive or may be coated with a coating that is configured so that the male parent plants produced by the second male seeds generally shed pollen at a later time than the male parent plants produced by the first male seeds. In such embodiments, the additive or coating may be associated with the second male seeds concurrent with planting or prior to planting. Thus, in embodiments where the second male seeds are associated with an additive or coating prior to planting, a seed planter may include a supply of first male seeds and a supply of second male seeds, where the supply of second male seeds comprises male seeds that are conditioned to produce male parent plants that generally shed pollen at a later time than the male parent plants produced by the first male seeds.

It should be noted that in other embodiments, instead of the second male seed groups 122 or areas of the field proximate the second male seed groups 122 being treated with an additive that is configured to slow down germination of the plants produced by the second male seed groups 122, the first male seed groups 120 or areas of the field proximate the first male seed groups 120 may be treated with an additive that interacts with the first male seeds to effectively speed up germination of the male plants produced by the first male seeds. Such additives may include, but need not be limited to, osmotic priming or similar materials, such as polyethylene glycol or potassium salts. In some embodiments, such an additive may be used as a pre-treatment. In still other embodiments, both the first seed group 120 and the second seed group 122 and/or the areas of the field proximate these groups may be treated with at least one additive.

Referring to FIG. 4, in some embodiments where there are separate supplies of first male seeds and second male seeds, the seed planter 130 may include a seed supply 136 that includes a supply of first male seeds in a first seed supply bin 140 and a supply of second male seeds in a second seed supply bin 142. The two seed supply bins 140, 142 may then feed into a diverter device 144 that directs the respective seeds into the seed release/metering device 138. In various embodiments, the positional data system 132 and the controller 134 may be used to guide and/or control the seed planter 130 to release the seeds at certain locations within the field. In particular, the controller 134 may control the diverter device 144 and the seed release/metering device 138 such that first male seeds from the first seed supply bin 140 are planted in the areas of the field intended to include first male seeds (e.g., the areas of the first male seed groups), and second male seeds from the second seed supply bin 142 are planted in the areas of the field intended to include second male seeds (e.g., the areas of the second male seed groups). Although not shown in the drawings, in other embodiments the seed planter may also include a third supply bin that includes the female seeds. In such embodiments, a common seed planter may be used to plant the female seeds and the first and second male seeds during a single pass through the field, thus eliminating a need to traverse the seed planter through previously planted areas. It should be noted, however, that in other embodiments, any one of the first male seeds, the second male seeds, or the female seeds may be planted with a dedicated seed release/metering device or a dedicated seed planter.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of extending the duration of pollen availability during seed production, said method comprising:
   planting a section of male seeds in a field; and
   planting a section of female seeds in the field, the section of female seeds comprising at least one row of female seeds adjacent and substantially parallel to the section of male seeds,
   wherein planting the section of male seeds comprises planting a row of male seeds, wherein the row of male seeds includes at least two alternating groups of male seeds, and wherein one group of male seeds is planted or conditioned so as to produce plants that generally shed pollen at a different time than plants produced by one or more other groups of male seeds.

2. The method of extending the duration of pollen availability during seed production of claim 1, further comprising capturing locations of at least one of the groups of male seeds using a positional data system.

3. The method of extending the duration of pollen availability during seed production of claim 1, further comprising capturing locations of the planted seeds within at least one of the groups of male seeds using a positional data system.

4. The method of extending the duration of pollen availability during seed production of claim 1, further comprising activating a seed planter using a positional data system to plant the section of male seeds and the section of female seeds.

5. The method of extending the duration of pollen availability during seed production of claim 4, wherein the seed planter is activated using at least one of a timer and a satellite navigation system.

6. The method of extending the duration of pollen availability during seed production of claim 1, wherein planting the section of male seeds comprises planting the one group of male seeds at a different time than planting the one or more other groups of male seeds.

7. The method of extending the duration of pollen availability during seed production of claim 6, further comprising capturing a location using a positional data system where at least one of the groups of male seeds is planted.

8. The method of extending the duration of pollen availability during seed production of claim 6, further comprising capturing locations using a positional data system where individual seeds within at least one of the groups of male seeds are planted.

9. The method of extending the duration of pollen availability during seed production of claim 6, wherein planting the section of male seeds comprises planting the one group of male seeds in a position that is slightly offset from the one or more other groups of male seeds such that the row of male seeds is a slightly staggered row of male seeds.

10. The method of extending the duration of pollen availability during seed production of claim 1, wherein planting the section of male seeds further comprises applying an additive to the field in areas of the field proximate the one group of male seeds, and wherein the additive is configured so that plants produced by the one group of male seeds generally shed pollen at a different time than plants produced by the one or more other groups of male seeds.

11. The method of extending the duration of pollen availability during seed production of claim 10, wherein the additive is applied to the field substantially concurrently with planting the one group of male seeds.

12. The method of extending the duration of pollen availability during seed production of claim 10, wherein the additive comprises at least one of a hormone additive or a chemical additive.

13. The method of extending the duration of pollen availability during seed production of claim 1, further comprising coating the one group of male seeds with a coating that is configured so that plants produced by the one group of male seeds generally shed pollen at a different time than plants produced by the one or more other groups of male seeds.

14. The method of extending the duration of pollen availability during seed production of claim 1, wherein planting the section of male seeds comprises planting the one group of male seeds at a later time than planting the one or more other groups of male seeds such that plants produced by the one group of male seeds generally shed pollen at a later time than plants produced by the one or more other groups of male seeds.

15. The method of extending the duration of pollen availability during seed production of claim 1, wherein planting the section of male seeds further comprises applying an additive to the field in areas of the field proximate the one group of male seeds, and wherein the additive is configured so that plants produced by the one group of male seeds generally shed pollen at a later time than plants produced by the one or more other groups of male seeds.

16. The method of extending the duration of pollen availability during seed production of claim 1, further comprising coating the one group of male seeds with a coating that is configured so that plants produced by the one group of male seeds generally shed pollen at a later time than plants produced by the one or more other groups of male seeds.

17. The method of extending the duration of pollen availability during seed production of claim 1, wherein planting the section of male seeds further comprises applying an additive to the field in areas of the field proximate the one group of male seeds, and wherein the additive is configured so that plants produced by the one group of male seeds generally shed pollen at an earlier time than plants produced by the one or more other groups of male seeds.

18. The method of extending the duration of pollen availability during seed production of claim 1, further comprising coating the one group of male seeds with a coating that is configured so that plants produced by the one group of male seeds generally shed pollen at an earlier time than plants produced by the one or more other groups of male seeds.

19. The method of extending the duration of pollen availability during seed production of claim 1, further comprising planting a second section of male seeds, wherein planting the second section of male seeds comprises planting a row of male seeds adjacent to and on an opposite side of the first section of female seeds, wherein the row of male seeds of the second section of male seeds includes at least two alternating groups of male seeds, and wherein one group of male seeds is planted or conditioned so as to produce plants that generally shed pollen at a different time than plants produced by the one or more other groups of male seeds.

20. The method of extending the duration of pollen availability during seed production of claim 19, wherein each of the groups of male seeds of the first and second sections of male seeds extends a substantially similar seed planting length, and wherein the first section of male seeds begins with a group of first male seeds and alternates to a group of second male seeds, and the second section of male seeds begins a group of second male seeds and alternates to a group of first male seeds, and wherein one of the group of first male seeds or the group of second male seeds is planted or conditioned to produce plants that generally shed pollen at a different time than the other of the group of first male seeds or the group of second male seeds.

* * * * *